United States Patent [19]

Iino et al.

[11] Patent Number: 5,210,816
[45] Date of Patent: May 11, 1993

[54] OPTICAL FIBER AND PROCESS OF PRODUCING SAME

[75] Inventors: Akira Iino; Masahide Kuwabara, both of Ichihara, Japan

[73] Assignee: The Furukawa Electric Co., Ltd., Tokyo, Japan

[21] Appl. No.: 899,864

[22] Filed: Jun. 17, 1992

[30] Foreign Application Priority Data

Jun. 24, 1991 [JP] Japan .................................. 3-178705

[51] Int. Cl.$^5$ ......................... G02B 6/02; G02B 6/00; C03C 25/02
[52] U.S. Cl. .................................... 385/142; 385/141; 385/123; 385/124; 65/3.11; 65/3.12
[58] Field of Search ............... 385/123, 124, 126, 141, 385/142; 65/3.11, 3.12, 1

[56] References Cited

U.S. PATENT DOCUMENTS

| | | | |
|---|---|---|---|
| 3,981,707 | 9/1976 | Araujo et al. | 385/124 X |
| 4,082,420 | 4/1978 | Shiraishi et al. | 385/124 X |
| 4,210,386 | 7/1980 | Araujo et al. | 385/124 X |
| 4,221,825 | 9/1980 | Guerder et al. | 385/124 X |
| 4,339,173 | 7/1982 | Aggarwal et al. | 385/124 X |
| 4,413,882 | 11/1983 | Bailey et al. | 385/124 |
| 4,616,901 | 10/1986 | MacChesney et al. | 385/141 X |
| 4,971,423 | 11/1990 | Nakata et al. | 385/124 X |
| 5,048,923 | 9/1991 | Tsumanuma et al. | 385/124 X |

FOREIGN PATENT DOCUMENTS

| | | | |
|---|---|---|---|
| 0160244 | 11/1985 | European Pat. Off. | 385/141 X |
| 0191202 | 8/1986 | European Pat. Off. | 385/141 X |
| 0313209 | 4/1989 | European Pat. Off. | 372/6 X |
| 61-191543 | 8/1986 | Japan | 385/141 X |
| 62-108744 | 5/1987 | Japan | 385/124 X |
| 1-024041 | 1/1989 | Japan | 385/141 X |
| 2-285305 | 11/1990 | Japan | 385/124 X |
| 2100464 | 12/1982 | United Kingdom | 385/124 X |
| 2129152 | 5/1984 | United Kingdom | 385/124 X |

*Primary Examiner*—Brian Healy

[57] ABSTRACT

In the optical fiber, the concentration of fluorine doped in the core portion is made nonuniform in the radial direction to be greater at the center portion of the core portion and less at the outer circumferential portion of the core portion. As a result, the distribution of the refractive index of the core portion and the cladding portion before the process of transparent glassification becomes a profile which is high at the outer circumferential portion of the core portion and which is low at the center portion. The reduction of the refractive index at the outer circumferential portion of the core portion due to the dispersion of the $GeO_2$ etc., the oxide included in the core portion, in the cladding portion in the transparent glassification processed is and as a result, the profile of the refractive index of the core portion becomes one which sticks out in a step form with respect to the cladding portion.

8 Claims, 2 Drawing Sheets

OPTICAL FIBER AND PROCESS OF PRODUCING SAME

BACKGROUND OF THE INVENTION

1. Field of the Invention

The present invention relates to an optical fiber used, for example, in a long distance optical transmission system, more particularly relates to an optical fiber preform and an optical fiber formed by the preform which improves the profile of the refractive index of the core portion to an ideal shape and to a process of producing the same.

2. Description of the Related Art

For long distance optical transmission systems, single mode optical fibers with a core portion with an extremely reduced amount of doping of $GeO_2$ by which the Rayleigh scattering coefficient is reduced, has been used. Usually fluorine is doped into a cladding portion of the fiber for the purpose of increasing the difference in refractive index with the core portion.

In such a single mode optical fiber, the profile of the refractive index of the core portion desirably should have a step-like profile compared with the cladding portion. This is in particular to prevent an increase in the optical transmission loss with respect to bending of the optical fiber.

However, in the conventional optical fibers and processes of production thereof, it was not possible to make the profile of the refractive index of the core portion the ideal step shape. As shown in FIG. 1, a core portion 2 ended up with a profile of the refractive index which sticks up in a gentle mountain form compared with a cladding portion 4. Then, the optical fiber suffers from the problem that the effective refractive index of the core portion dropped and the optical transmission loss with respect to bending of the fiber increased.

Note that the reason why the profile of the refractive index as shown in FIG. 1 is obtained is considered to be because the $GeO_2$ included in the core portion vaporizes from the surface of the soot during dehydration step and diffuses to the cladding portion at the interface of the core portion and cladding portion during the transparent glassification step in the process of production of the optical fiber. Therefore, it is extremely difficult to dope $GeO_2$ uniformly in the core portion and obtain a step-like refractive index profile. Note that the dotted line portion A in FIG. 1 is a straight line corresponding to the refractive index in the case of $SiO_2$ alone without any doping.

SUMMARY OF THE INVENTION

An object of the present invention is to provide an optical fiber preform and a process of producing the same which enables the profile of the refractive index between a core portion and a cladding portion to be made the ideal profile and in particular which enables the prevention of an increase in the optical transmission loss with respect to bending of an optical fiber.

According to the present invention there is provided an optical fiber preform including a core portion and a cladding portion provided on the outside of the core portion and having a refractive index smaller than the refractive index of the core portion, characterized in that at least the core portion is doped with fluorine and an oxide and in that the fluorine contained in the core portion is doped more toward the center in the radial direction than the outer circumferential portion.

Preferably, the oxide is at least one of $GeO_2$ and $P_2O_5$.

Also, preferably, the concentration of the $GeO_2$ or $P_2O_5$ is up to 1 mol %.

Also, according to the present invention, there is provided a process of producing an optical fiber preform characterized by forming a core portion doped with an oxide and having a higher bulk density at the outer circumferential portion of the core portion compared with the center portion and heat treating the core portion in a fluorine gas atmosphere, thereby doping the fluorine in the core portion so that the concentration of fluorine at the center portion of the core portion becomes relatively larger compared with the outer circumferential portion.

Further, according to the present invention, there is provided an optical fiber formed by the above optical fiber preform.

Also, according to the present invention, there is provided a process for producing an optical fiber by using the above process, and further including forming a cladding portion provided on the outer circumference of the core portion so as to produce a fiber material, and transparent-glassifying the fiber material and drawing it so as to produce an optical fiber.

In the optical fiber of the present invention, the concentration of the fluorine doped in the core portion is made larger in the center portion of the core portion and made smaller in the outer circumferential portion of the core portion, so the profile of the refractive index of the core portion and the cladding portion before the step of transparent glassification becomes a profile which is high at the outer circumferential portion of the core portion and which is low at the center portion. Therefore, the reduction of the refractive index at the outer circumferential portion of the core portion due to the dispersion of the $GeO_2$ etc., the oxide included in the core portion, in the cladding portion in the transparent glassification step is corrected and as a result, the profile of the refractive index of the core portion becomes one which sticks out in a step form with respect to the cladding portion.

BRIEF DESCRIPTION OF THE DRAWINGS

The above and other objects and the above and other features of the present invention will be described in detail with reference to the accompanying drawings, in which.

DESCRIPTION OF THE PREFERRED EMBODIMENTS

The optical fiber preform according to the present invention has a core portion 2 comprised of silica based glass which is doped with an oxide and wherein the amount of the doping of fluorine is smaller at the outer circumferential portion compared with the center portion of the core portion. At the outer circumference of the core portion 2 a cladding portion 4 comprised of silica based glass with a lower refractive index compared with the core portion is provided. To lower the refractive index of the cladding portion 4, the cladding portion 4 is doped uniformly with fluorine etc., for example.

The oxide to be doped in the core portion 2 is not particularly limited so long as it is an oxide where the refractive index of the core portion 2 is made higher compared with the cladding portion 4, but for example mention may be made of $GeO_2$, $P_2O_5$, etc. The amount of doping of these oxides is preferably not more than 1 mol % from the viewpoint of preventing optical loss due to Rayleigh scattering.

Figure 2A:
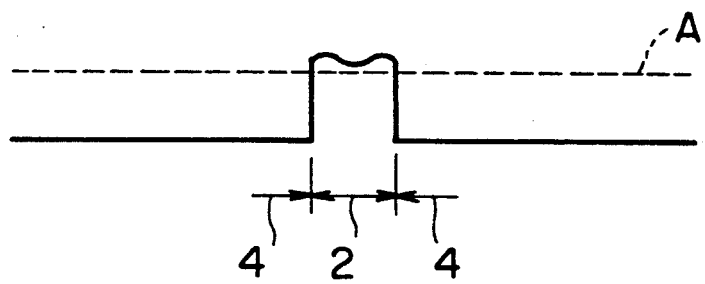
FIGS. 2a and 2b are graphs showing the profile of the refractive index in the process of production of an optical fiber preform in accordance with an embodiment of the present invention.
Figure 2B:
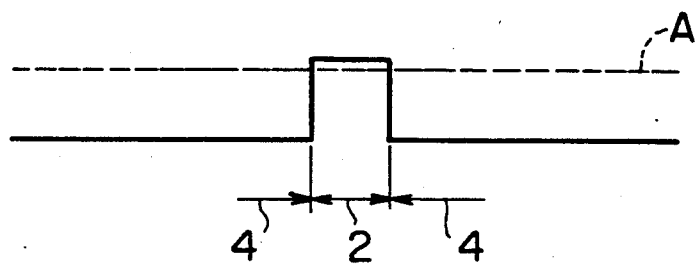

By making the amount of doping of the fluorine in the core portion 2 nonuniform and by reducing the amount of doping of the fluorine in the outer circumferential portion of the core portion 2 compared with the center portion, as shown in FIG. 2a, the profile of the refractive index of the core portion 2 and the cladding portion 4 before the transparent glassification process comes to have a profile higher at the outer circumferential portion of the core portion 2 and lower at the center portion. By doping the fluorine, the refractive index at that portion falls in accordance with the amount of doping. Therefore, the reduction in the refractive index at the outer circumferential portion of the core portion 2 due to the dispersion of the $GeO_2$ etc., serving as the oxide included in the core portion 2, in the cladding portion 4 in the process of transparent glassification is corrected. As a result, as shown in FIG. 2b, the profile of the refractive index of the core portion 2 becomes a profile sticking out in a step form with respect to the cladding portion 4.

The means for reducing the amount of fluorine doped at the outer circumferential portion compared with the center portion of the core portion 2 is not particularly limited, but the following method may be considered.

When producing a core portion 2, the soot density is changed at the center portion and the outer circumferential portion of the core portion 2 so as to make the soot density higher at the outer circumferential portion of the core portion 2 compared with the center portion. After this, by the heat treatment under a fluorine gas atmosphere in the dehydration process or the transparent glassification process, fluorine is doped so as to make the concentration higher at the center portion of the core portion 2. As a result, the profile of the refractive index of the core portion 2 as shown in FIG. 2a is obtained.

The following method may be illustrated as a means for causing a change in the soot density of the core portion 2.

Figure 3:
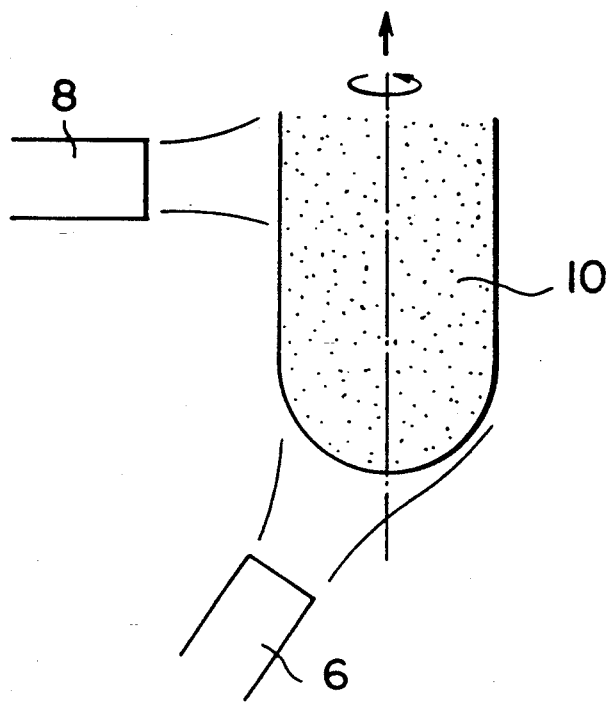
FIG. 3 is a schematic view showing the process of production of an optical fiber preform according to an embodiment of the present invention.

As shown in FIG. 3, when producing a silica based glass particulate soot (preform) 10 for forming the core portion 2 by the VAD method, two burners 6 and 8 are used. A first burner 6 is directed to the lower tip portion of the soot for forming the core portion, and, is supplied with silicon chloride ($SiCl_4$), germanium chloride ($GeCl_4$), hydrogen gas ($H_2$), oxygen gas ($O_2$) and argon gas (Ar) and emits a flame including glass particles. A second burner 8 is directed to the outer circumferential portion of the soot 10 for sintering use, and, is supplied with hydrogen gas ($H_2$) and oxygen gas ($O_2$) and emits a flame. By this VAD method, the density of the porous body comprising the soot 10 becomes larger the more to the circumferential portion of the core portion 2. Therefore, regarding the density of the soot forming the core portion 2, the density at the outer circumferential portion becomes larger than at the center portion. Due to the heat treatment, including fluorine gas (F), at the subsequent processes, a core portion 2 is formed where more fluorine (F) is doped the more to the center portion of the core portion 2.

Below, the present invention will be explained with reference to a more specific example, but the present invention is not limited to this example.

EXAMPLE 1

By the method shown in FIG. 3, silica based glass particulate soot 10 for forming the core portion 2 is prepared. Material gas such as shown in Table 1 is passed to silica based glass four-layer-tube burners 6 and 8. Note that the Table 1, the center tube of the four-layer-tube burner is made the first layer and the surrounding tubes are successively made the second, third, and fourth layers.

TABLE 1

|  | First burner 6 | Second burner 8 |
|---|---|---|
| 1st layer | $SiCl_4$ (43° C.) 115 [cc/min]<br>$GeCl_4$ (−3° C.) 120 [cc/min] |  |
| 2nd layer | $H_2$ 5.9 [l/min] | $H_2$ 5.9 [l/min] |
| 3rd layer | Ar 1.7 [l/min] | Ar 1.7 [l/min] |
| 4th layer | $O_2$ 6.4 [l/min] | $O_2$ 6.4 [l/min] |

Figure 4:
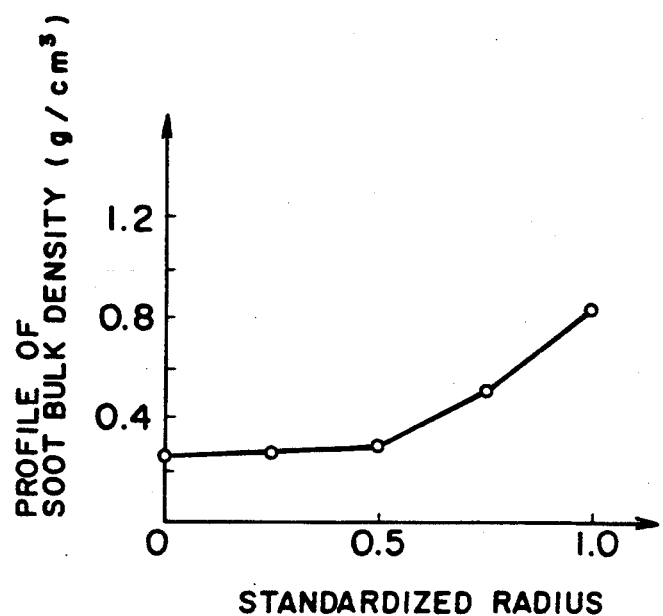
FIG. 4 is a graph showing the distribution of the bulk density of the core portion.

Investigating the density of the obtained soot 10 in the radial direction, as shown in FIG. 4, it was confirmed that the soot density of the porous body was larger the more to the outer circumferential portion of the core portion 2. Therefore, when doping fluorine under the conditions of Table 2, it is recognized that the fluorine is easier to dope the more to the center portion. The soot 10 was subjected to transparent glassification process under the conditions of Table 2 in a heating furnace (or electric furnace) for dehydration and transparent glassification.

TABLE 2

|  | 1st step | 2nd step | 3rd step |
|---|---|---|---|
| Temperaure (°C.) | 1100 | 900 | 1430 |
| He flow rate (l/min) | 30 | 30 | 30 |
| $Cl_2$ flow rate (l/min) | 0.3 | 0.3 | 0.3 |
| $SiF_4$ flow rate (l/min) | 0 | 0.03 | 0 |
| Falling rate (mm/hr) | 150 | 450 | 150 |

This glass rod was drawn to a diameter of 10 mm, then silica based glass particulate was deposited on the outside of the silica based glass rod by the external deposition method (OVD method) and thereafter the process of transparent glassification under conditions of Table 3 in an electric furnace was repeated. The deposition of silica based glass particulates and the transparent glassification were performed until the cladding ratio of the core portion became 12.5. The resultant material was drawn at a rate of 180 m/min by a drawing furnace. An ultraviolet ray curing resin was immediately coated on it to give a single mode optical fiber including a core having a diameter of 10 μm and a cladding having a 125 μm, and a covering outer diameter of 250 μm.

TABLE 3

|  | 1st step | 2nd step |
|---|---|---|
| Temperature (°C.) | 1000 | 1350 |
| He flow rate (l/min) | 30 | 15 |
| $Cl_2$ flow rate (l/min) | 0.3 | 0.15 |
| $SiF_4$ flow rate (l/min) | 0 | 2.0 |
| Falling rate (mm/hr) | 450 | 150 |

COMPARATIVE EXAMPLE 1

On the other hand, the same process as in Example 1 was used to prepare a single mode optical fiber except that the core soot was prepared without using the four-layer-tube burner 2 in FIG. 3.

The two single mode fibers were wound on a 15 mmφ and 20 mmφ mandrel and compared as to the increase in loss due to bending. The results are shown in Table 4.

TABLE 4

Figure 1:
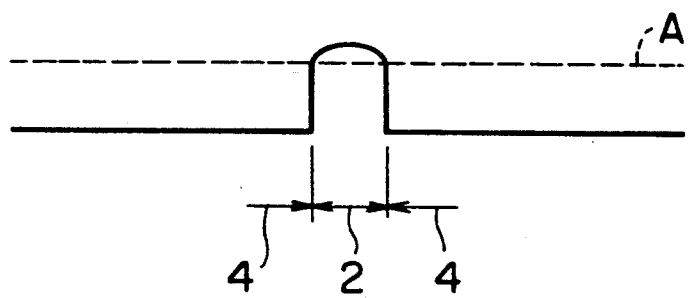
FIG. 1 is a graph showing the profile of the refractive index of a conventional optical fiber preform.

| Single mode optical fiber | Increase in loss (dB/km) | | $\lambda_c$ (μm) | $\Delta^-$ (%) |
|---|---|---|---|---|
| | 15 mmφ | 20 mmφ | | |
| Example 1 Profile of refractive index shown in FIG. 1(B) | 1.1 | 0.1 | 1.47 | 0.36 |
| Comp. Ex. 1 Profile of refractive index shown in FIG. 4 | 4.0 | 0.4 | 1.47 | 0.35 |

As shown in Table 4, Example 1 was confirmed to have a smaller increase in loss with respect to bending compared with the conventional optical fiber shown in Comparative Example 1.

Note that in the above-mentioned embodiment, an example of a single-mode optical fiber was shown, but the present invention may be applied to a multiple-mode optical fiber and a constant polarized light optical fiber as well. Further, the core may be doped with $P_2O_5$ instead of $GeO_2$. However, if too much is doped, the optical loss due to Rayleigh scattering becomes significant. Therefore, it is preferable that the concentration of the $GeO_2$ or the $P_2O_5$ be made not more than 1 mol %.

As explained above, according to the present invention, there is provided an optical fiber doped with a small amount of an oxide at the core which has the superior effects of enabling the distribution of the refractive index of the core portion and the cladding portion to be made the ideal profile and enabling a reduction of the optical transmission loss with respect to bending of the optical fiber.

Many widely different embodiments of the present invention may be constructed without departing from the spirit and scope of the present invention, and it should be understood that the present invention is not restricted to the specific embodiments described above.

We claim:

1. An optical fiber preform including a core portion and a cladding portion provided on the outside of the core portion and having a refractive index smaller than the refractive index of the core portion, said optical fiber preform characterized in that at least the core portion is doped with fluorine and an oxide and in that the fluorine contained in the core portion is doped more toward the center in the radial direction than the outer circumferential portion.

2. An optical fiber preform as set forth in claim 1, wherein the oxide is at least one of $GeO_2$ and $P_2O_5$.

3. An optical fiber preform as set forth in claim 2, wherein characterized in that the concentration of the $GeO_2$ or $P_2O_5$ is up to 1 mol %.

4. A process of producing an optical fiber preform characterized by forming a core portion doped with an oxide and having a higher soot density at the outer circumferential portion of the core portion compared with the center portion and heat treating the core portion in a fluorine gas atmosphere, thereby doping the fluorine in the core portion so that the concentration of fluorine at the center portion of the core portion becomes relatively larger compared with the outer circumferential portion.

5. An optical fiber including a core and a cladding provided on the outside of the core and having a refractive index smaller than the refractive index of the core, said optical fiber characterized in that at least the core portion is doped with fluorine and an oxide and in that the fluorine contained in the core is doped more toward the center in the radial direction than the outer circumferential portion.

6. An optical fiber as set forth in claim 1, wherein the oxide is at least one of $GeO_2$ and $P_2O_5$.

7. An optical fiber as set forth in claim 2, wherein characterized in that the concentration of the $GeO_2$ or $P_2O_5$ is up to 1 mol %.

8. A process of producing an optical fiber characterized by forming a core doped with an oxide and having a higher bulk density at the outer circumferential portion of the core compared with the center portion and heat treating the core portion in a fluorine gas atmosphere, thereby doping the fluorine in the core portion so that the concentration of fluorine at the center portion of the core portion becomes relatively larger compared with the outer circumferential portion, forming a cladding portion provided on the outer circumference of the core portion so as to produce a fiber material, and transparent-glassifying the fiber material and drawing it so as to produce an optical fiber including a core formed by said core portion and a cladding formed by said cladding portion.

* * * * *